United States Patent
Shinozaki (10) Patent No.: US 9,158,377 B2
(45) Date of Patent: Oct. 13, 2015

(54) ELECTRONIC DEVICE TO MAINTAIN CONTACT POSITION DURING HAPTIC FEEDBACK

(75) Inventor: Takayuki Shinozaki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 80 days.

(21) Appl. No.: 13/982,240

(22) PCT Filed: Jan. 26, 2012

(86) PCT No.: PCT/JP2012/000501
§ 371 (c)(1),
(2), (4) Date: Jul. 26, 2013

(87) PCT Pub. No.: WO2012/102048
PCT Pub. Date: Aug. 2, 2012

(65) Prior Publication Data
US 2013/0307808 A1   Nov. 21, 2013

(30) Foreign Application Priority Data

Jan. 27, 2011   (JP) ................. 2011-015701

(51) Int. Cl.
*G06F 3/01* (2006.01)
*G06F 3/041* (2006.01)

(52) U.S. Cl.
CPC ............. *G06F 3/016* (2013.01); *G06F 3/0412* (2013.01)

(58) Field of Classification Search
CPC ...... G06F 3/016; G06F 3/0418; G06F 3/0412
See application file for complete search history.

(56) References Cited

U.S. PATENT DOCUMENTS

| 5,889,511 | A  * | 3/1999 | Ong et al. ................. 345/173 |
| 7,557,794 | B2 * | 7/2009 | Rosenberg et al. ........... 345/156 |
| 8,134,538 | B2   | 3/2012 | Nakayama |
| 8,797,277 | B1 * | 8/2014 | Grygorenko ................. 345/173 |
| 2009/0231293 | A1 | 9/2009 | Nakayama |
| 2011/0074694 | A1 * | 3/2011 | Rapp et al. ................. 345/173 |
| 2011/0302519 | A1 * | 12/2011 | Fleizach et al. ............. 715/773 |

FOREIGN PATENT DOCUMENTS

| JP | 2003-241898 A | 8/2003 |
| JP | 2005-275934 A | 10/2005 |
| JP | 2009-217687 A | 9/2009 |

OTHER PUBLICATIONS

International Search Report; PCT/JP2012/000501; Feb. 21, 2012.

* cited by examiner

*Primary Examiner* — Larry Sternbane
(74) *Attorney, Agent, or Firm* — Studebaker & Brackett PC (57) ABSTRACT

An electronic device (1) is provided with a contact detection unit (40) that detects contact by a contacting object, a vibration unit (50) that vibrates the contact detection unit (40), and a control unit (10) that controls the vibration unit (50) to vibrate. The control unit (10) treats a position of the contact detected by the contact detection unit (40) before the control unit (10) controls the vibration unit (50) to vibrate as a position of the contact being detected by the contact detection unit (40) while the control unit (10) controls the vibration unit (50) to vibrate.

6 Claims, 5 Drawing Sheets

ELECTRONIC DEVICE TO MAINTAIN CONTACT POSITION DURING HAPTIC FEEDBACK

CROSS-REFERENCE TO RELATED APPLICATION

This application claims priority to and the benefit of Japanese Patent Application No. 2011-15701 filed Jan. 27, 2011, the entire contents of which are incorporated herein by reference.

FIELD

The present invention relates to an electronic device such as an electronic device that performs predetermined processing, such as executing application software, based on an operation input into a contact detection unit, such as a touch sensor.

BACKGROUND ART

In recent years, among mobile terminals such as cellular phones, electronic devices are increasingly provided with a touch sensor, such as a touch panel or touch switch, as a member for detecting an operation by the operator. Electronic devices provided with a touch sensor are in wide use apart from mobile terminals as well, in devices such as calculators or ticket vending machines, household appliances such as microwave ovens, televisions, or lighting appliances, industrial devices (factory automation equipment), and the like.

A variety of types of such touch sensors are known, including a resistive film type, a capacitive type, and an optical type. All of these types of touch sensors detect contact by the operator's finger, a stylus pen, or the like. Typically, an electronic device provided with a touch sensor displays an image (hereinafter referred to as an "object") of an operation key, a button, or the like on the display screen of a display unit provided on the rear face of the touch sensor. In such an electronic device, when the operator presses an object displayed on the display screen, the touch sensor is configured to detect contact at the position of the press.

A variety of touch sensors have been proposed (for example, see Patent Literature 1). Patent Literature 1 proposes an analog resistive film type touch panel that can be produced at a low cost and with a reduced size. The touch panel disclosed in Patent Literature 1 has two conducting films with a slight gap therebetween provided by a spacer. The touch panel is configured to read the position of contact at which the conducting films are pressed as a voltage at one conducting film based on the voltage gradient on the other conducting film.

Many electronic devices provided with the above-described touch sensor perform different, predetermined processing in accordance with the position of the contact detected by the touch sensor. In other words, in the touch sensor corresponding to the object region displayed on the display unit, different processing is often allocated to each object. For example, in such an electronic device, a menu screen is displayed when contact is detected on the touch sensor at a position corresponding to a menu button object, whereas the cursor is moved when contact is detected on the touch sensor at a position corresponding to an arrow key object. When, for example, the processing to be initiated is thus distinguished in accordance with input corresponding to a plurality of objects, the accuracy with which the position of contact is detected is important when the touch sensor detects the contact. Therefore, when detecting the position of contact with a touch sensor, a technique has been proposed to accurately detect the position of contact (for example, see Patent Literature 2).

CITATION LIST

Patent Literature

1: JP2003241898A
2: JP2005275934A

In the touch panel device disclosed in Patent Literature 2, the occurrence of a voltage drop that depends on the resistance of one of two conducting films configuring the touch panel does not affect the result of detecting the contact position. In other words, the effect of a voltage drop in one of the two conducting films can be eliminated from the contact position detection result. Accordingly, the press position can be accurately identified.

With the touch panel device recited in Patent Literature 2, it is assumed that the position of contact on the touch panel is detected by contact with a pointer member such as a stylus pen. In the touch panel devices provided in mobile terminals that have become popular in recent years, however, it is often assumed that the operator provides operation input directly with a finger, without using a stylus pen or the like. If the operator uses a finger to provide a touch sensor with operation input, the position of contact detected by the touch sensor has a certain area, unlike when using a tapered member such as a stylus pen. When the touch sensor is thus contacted over a relatively large area or is contacted simultaneously at two or more positions, the two conducting films are connected over a larger section or at multiple locations.

When the location contacted on the touch sensor has a certain area, the contact position detected by the touch sensor becomes one of the positions within the contacted section. The detected contact position therefore varies within a predetermined area. As a result, the distribution of resistance in the conducting films becomes locally uneven, lowering the accuracy of detection of the contact position by the touch sensor.

SUMMARY

An electronic device according to a first aspect of the present invention for achieving the above object includes: a contact detection unit configured to detect contact by a contacting object; a vibration unit configured to vibrate the contact detection unit; and a control unit configured to control the vibration unit to vibrate, such that the control unit treats a position of the contact detected by the contact detection unit before the control unit controls the vibration unit to vibrate as a position of the contact being detected by the contact detection unit while the control unit controls the vibration unit to vibrate.

An electronic device according to a second aspect of the present invention for achieving the above object includes: a contact detection unit configured to detect contact by a contacting object; a vibration unit configured to vibrate the contact detection unit; and a control unit configured to control the vibration unit to vibrate, such that when detection by the contact detection unit of the contact by the contacting object ceases while the control unit is controlling the vibration unit to vibrate, the control unit treats a position of the contact detected before detection of the contact ceases as a position of the contact being detected by the contact detection unit.

According to the present invention, in an electronic device provided with a contact detection unit, the contact detection unit can accurately detect the contact position even when vibration is generated in the contact detection unit.

BRIEF DESCRIPTION OF DRAWINGS

The present invention will be further described below with reference to the accompanying drawings, wherein.

DESCRIPTION OF EMBODIMENTS

Figure 4:
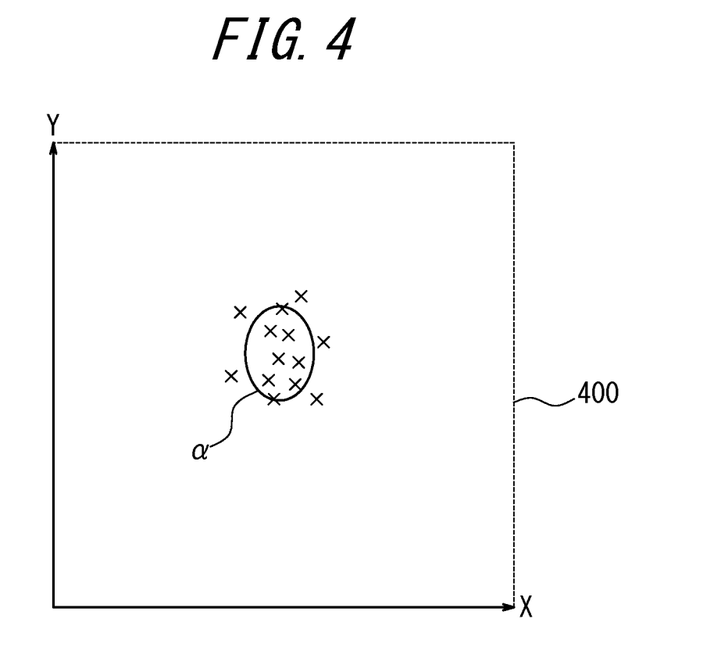
FIG. 4 illustrates contact positions detected by a touch sensor.

The following describes the state of a touch sensor when detecting contact by the operator. FIG. 4 is a planar schematic view from the front of a touch sensor 400 in a touch panel device. As illustrated in FIG. 4, a virtual xy coordinate system is defined in the touch sensor 400 for position detection.

Under these conditions, if the operator contacts the surface of the touch sensor 400 with his own finger, the portion of the operator's finger that contacts the touch sensor 400 has area, as indicated by α in the figure. When the contacted location has area as in this case, the contact position detected by the touch sensor 400 varies over a certain area as illustrated by the x's in the figure. If such a touch sensor is used to detect the contact position, the contact position is also detected at locations slightly off from (outside of) the area α that was actually contacted, as illustrated in the figure. In other words, the variation in contact position is even observed at locations on the touch sensor 400 not actually contacted by the operator. One reason is that the area of the section in which the conducting films of the touch sensor 400 contact each other is slightly larger than the area of the touch sensor 400 contacted by the operator's finger. This phenomenon is further described below.

Figure 5A:
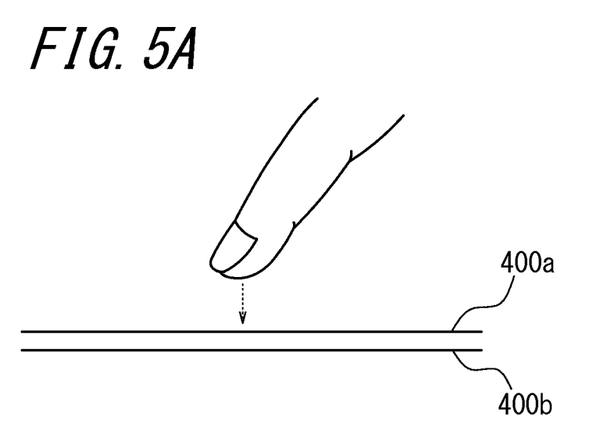
FIGS. 5A and 5B illustrate the state of a touch sensor when contact is detected.
Figure 5B:
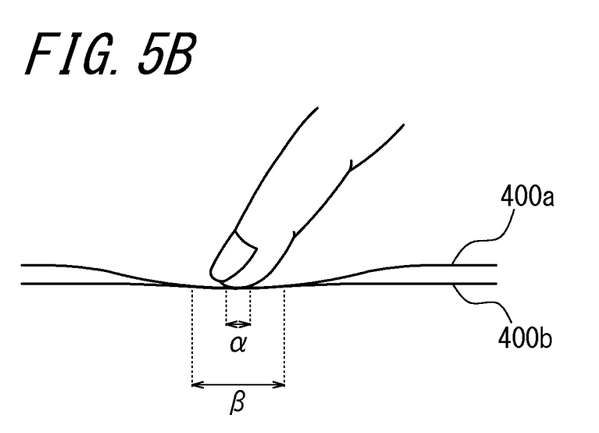

FIGS. 5A and 5B are a cross-sectional diagram of some portions of the touch sensor 400 in the touch panel device described in FIG. 4. As illustrated in FIG. 5A, the touch sensor 400 is composed of an upper conducting film 400a and a lower conducting film 400b. When the operator presses the upper conducting film 400a with a finger from above, the upper conducting film 400a bends as illustrated in FIG. 5B so as to contact the lower conducting film 400b. Although the operator's finger only contacts the conducting film 400a in a section with area α, the conducting film 400a around the area α simultaneously bends, as illustrated in the figure, so that an area β of contact between the upper conducting film 400a and the lower conducting film 400b is larger than the area α. Accordingly, the position of contact detected by the touch sensor 400 in this case is any position within the area β, resulting in the position of contact varying within the area β.

Such variation in the position of contact leads to the problem that when the operator intends to contact the touch sensor at a position corresponding to a predetermined object, contact may be detected at a position other than the object. If the operator presses the touch sensor with a strong pressing force, this variation in the contact position becomes even more noticeable, since the contact area of the conducting films increases.

Also of note is that when a contact operation is performed on a touch sensor, the operator does not obtain any feedback for the operation, since the touch sensor is not physically displaced like a push button switch. Therefore, terminals sold recently adopt a feedback method to produce a vibration at the operator's fingertip by vibrating the touch sensor when the touch sensor detects contact. According to such a terminal, the operator performing a contact operation can confirm, via a tactile sensation, that the terminal properly recognized the operation on the touch sensor.

Generating vibration while the touch sensor is detecting contact by the operator, however, is exactly the same as vibrating the sensor that detects contact by the operator. If vibration is generated while the touch sensor is detecting contact by the operator, the touch sensor itself of course moves, as does the operator's finger that is in contact with the touch sensor. Furthermore, the state of contact between the two conducting films as described in FIG. 5 also changes slightly. As a result, the position of contact detected by the touch sensor varies even more while the touch sensor is vibrating. Accordingly, from the perspective of accurate detection of the contact position as described above, vibrating the touch sensor during detection of contact in this way makes accurate detection of the contact position increasingly difficult.

Moreover, if vibration is generated while the touch sensor is detecting contact by the operator, the touch sensor moves slightly, so that the operator's finger in contact with the touch sensor might become separated from the touch sensor briefly against the operator's will. In such a case, contact of the touch sensor by the operator is broken, and based on the contact being broken, processing not intended by the operator is performed, such as termination of predetermined processing that was being performed and the start of the next predetermined processing.

The present invention has been conceived in light of these circumstances, and is to provide an electronic device that includes a mechanism for generating vibration in a contact detection unit and in which the contact detection unit can accurately detect the contact position even when vibration is generated in the contact detection unit.

Embodiment 1

The following describes Embodiment 1 of the present invention with reference to the drawings.

Figure 1:
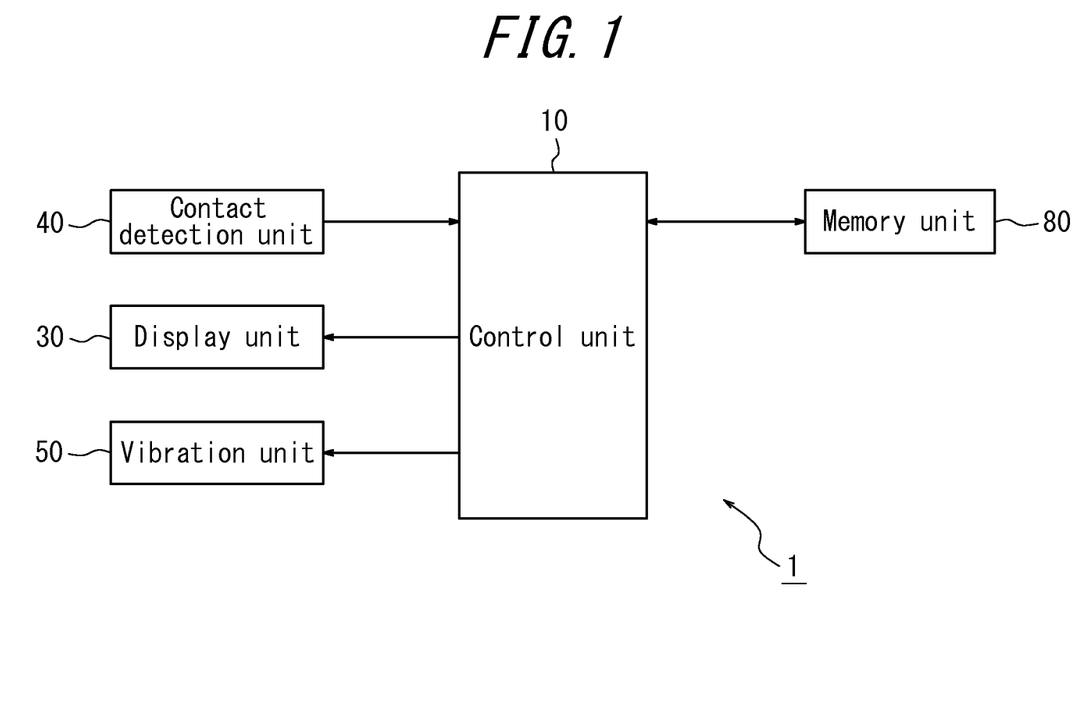
FIG. 1 is a functional block diagram schematically illustrating the configuration of an electronic device according to an embodiment of the present invention.

FIG. 1 is a block diagram schematically illustrating the configuration of an electronic device according to Embodiment 1 of the present invention.

As illustrated in FIG. 1, an electronic device 1 according to Embodiment 1 is provided with a control unit 10, a display unit 30, a contact detection unit 40, a vibration unit 50, and a memory unit 80.

The control unit 10 controls and manages the entire electronic device 1 by controlling the functional units constituting the electronic device 1. Among the processing by the control unit 10, the processing particular to the present embodiment is described below.

The display unit 30 displays objects, such as a push button switch (push-type button switch), as images. These objects are images serving to suggest, to the operator, regions on the touch face of the contact detection unit 40 to be contacted. A push button switch is a button, key, or the like with which the operator performs an input operation (hereinafter collectively referred to as a "key or the like"). The display unit 30 is, for example, configured using a liquid crystal display panel (LCD), an organic EL display panel, or the like.

The contact detection unit 40 is normally provided on the front face of the display unit 30 and detects, on a corresponding touch face of the contact detection unit 40, contact by the operator's finger, a stylus pen, or the like (hereinafter collectively referred to as a "contacting object") with an object displayed on the display unit 30. The contact detection unit 40 also detects the position of the contact by the contacting object on the touch face and notifies the control unit 10 of the detected position of the contact. The contact detection unit 40 can, for example, be configured using a touch sensor that is a resistive film type, a capacitive type, an optical type or the like.

The vibration unit 50 is, for example, configured using a piezoelectric element and vibrates the contact detection unit 40. By generating vibration in a predetermined vibration pattern, the vibration unit 50 provides a tactile sensation to the contacting object that is contacting the touch face. In the present embodiment, the vibration unit 50 generates vibration based on a drive signal provided by the control unit 10. In other words, in the present embodiment, the control unit 10 controls the vibration unit 50 to vibrate. When doing so, the control unit 10 can also vary the drive signal that drives the vibration unit 50 in accordance with the position of the contact by the contacting object as detected by the contact detection unit 40. The control unit 10 can thus cause different types of vibration to be generated in accordance with the object, displayed on the display unit 30, that corresponds to the position of the contact detected by the contact detection unit 40.

The memory unit 80 is, for example, configured using NAND-type flash memory or the like and stores not only various application software (hereinafter simply referred to as an "application") executed on the electronic device 1 but also stores a variety of information. In particular, in the present embodiment, at any time the memory unit 80 can store the position of the contact detected by the contact detection unit 40.

Next, processing when the electronic device 1 according to the present embodiment detects a contact operation by the operator is described.

Figure 2:
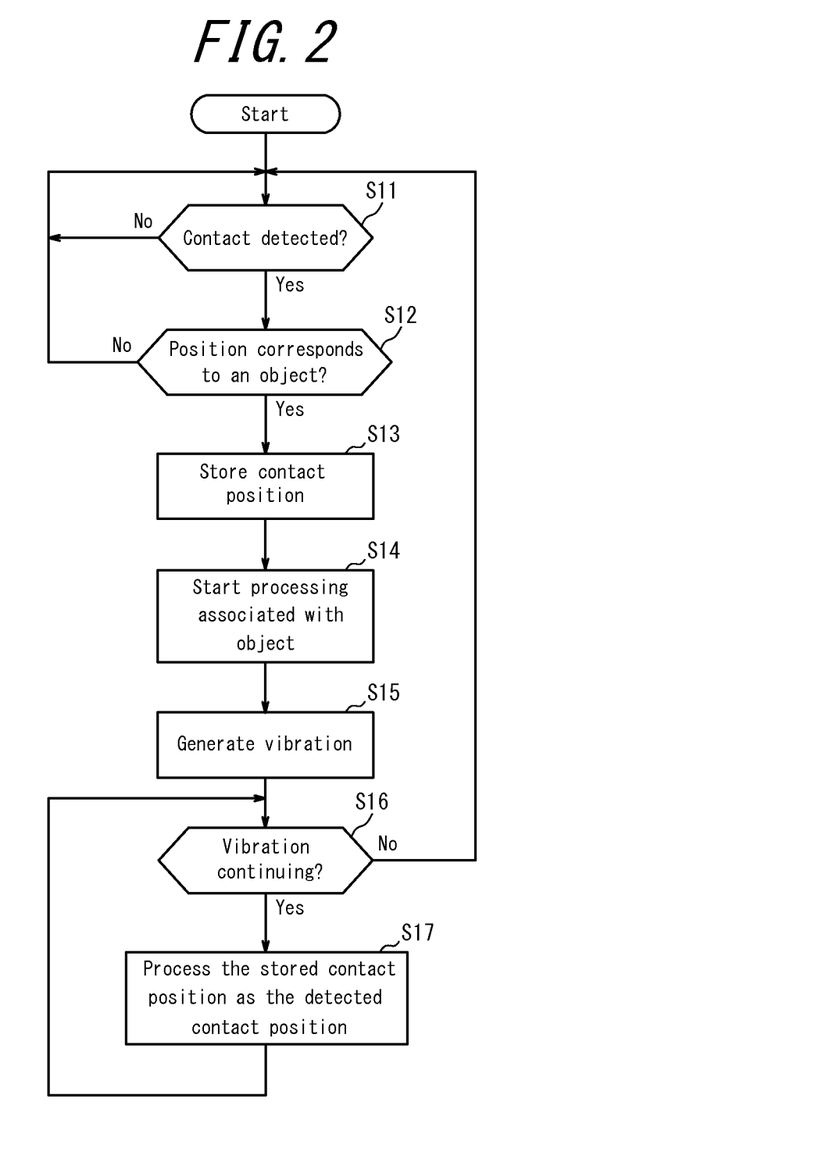
FIG. 2 is a flowchart illustrating processing by the electronic device according to an embodiment of the present invention.

FIG. 2 is a flowchart illustrating processing by the electronic device 1 according to Embodiment 1. In the present embodiment, while the vibration unit 50 is vibrating, the electronic device 1 processes a position of contact detected by the contact detection unit 40 before the start of vibration as the position of contact currently being detected by the contact detection unit 40.

The following describes the above processing in detail. At the start of the processing in the present embodiment, it is assumed that the electronic device 1 displays at least one object, such as a key or icon, associated with predetermined processing, such as the start of an application, on the display unit 30 in advance.

When the processing in the present embodiment starts, the control unit 10 of the electronic device 1 determines whether the contact detection unit 40 has detected contact by a contacting object, such as the operator's finger or a stylus (step S11). When contact by a contacting object is detected in step S11, the control unit 10 determines whether the position of the contact is a position corresponding to a predetermined object displayed on the display unit 30 (step S12). When the position of the contact in step S12 is a position corresponding to an object, the control unit 10 stores the position of the detected contact in the memory unit 80 (step S13).

Upon storage of the position of contact in the memory unit 80 in step S13, the control unit 10 starts processing associated with the object corresponding to the position at which the contact was detected (step S14). If, for example, contact is detected at a position corresponding to an icon (object) that launches a music player application, the "processing associated with the object" refers to launching the music player application associated with the icon. As another example, if the contact is detected at a position corresponding to a key object for character input in character input mode or the like, the character associated with the object can be displayed on the display unit 30.

When processing associated with the object starts in step S14, the control unit 10 controls the vibration unit 50 to generate vibration (step S15). The control unit 10 can vary the type of vibration generated in step S15 in accordance with the object corresponding to the position at which contact is detected, or in accordance with the processing that starts based on detection of contact.

Once vibration is generated in step S15, the control unit 10 determines whether the generated vibration is still continuing (step S16). In step S16, when the vibration has already stopped, the control unit 10 returns to step S11 and continues processing, since the detected position of contact will not vary due to vibration.

When vibration is still continuing in step S16, the detected position of contact may vary due to the vibration, and therefore the control unit 10 performs the processing in step S17. In step S17, the control unit 10 performs control to use, as the position of contact detected by the contact detection unit 40, the position of contact stored in step S13. The control unit 10 for example can perform processing such as substituting the position of contact stored in step S13 for the position of the contact detected by the contact detection unit 40. Subsequently, the control unit 10 continues the processing in step S17 for as long as the vibration generated by the vibration unit 50 continues.

Accordingly, the control unit 10 performs control to process a position of the contact detected by the contact detection unit 40 before the control unit 10 controls the vibration unit 50 to vibrate as a position of the contact being detected by the contact detection unit 40 while the control unit 10 controls the vibration unit 50 to vibrate. In other words, in this case, the control unit 10 performs control to treat the position of the contact detected by the contact detection unit 40 before the control unit 10 controls the vibration unit 50 to vibrate as the position of the contact being detected by the contact detection unit 40.

By performing this processing, the electronic device 1 of the present embodiment uses the position from before generation of vibration as the position detected by the contact detection unit 40 while the vibration unit 50 is generating vibration. Therefore, according to the present embodiment, accuracy of detection of the contact position by the contact detection unit 40 can be increased even while vibration is being generated. In other words, according to the present embodiment, even if the position at which the operator contacts the contact detection unit 40 fluctuates due to the generated vibration, such fluctuation does not cause the detected position of contact to fluctuate.

Embodiment 2

Next, an electronic device according to Embodiment 2 of the present invention is described.

In Embodiment 2, processing by the control unit 10 in Embodiment 1 is modified. That is, in an electronic device 2 according to Embodiment 2, the processing executed after step S15 in the electronic device 1 according to Embodiment 1 illustrated in FIG. 2 is modified. For example, the electronic device 2 according to Embodiment 2 continues to accurately detect an appropriate position of contact even when contact with the contact detection unit 40 is broken against the operator's will while the vibration unit 50 is generating vibration.

Other than the above points, the electronic device 2 according to Embodiment 2 can be achieved with basically the same device configuration and control as the electronic device 1 described in Embodiment 1 above. Therefore, a description of the same content as described in Embodiment 1 is omitted below as appropriate.

Figure 3:
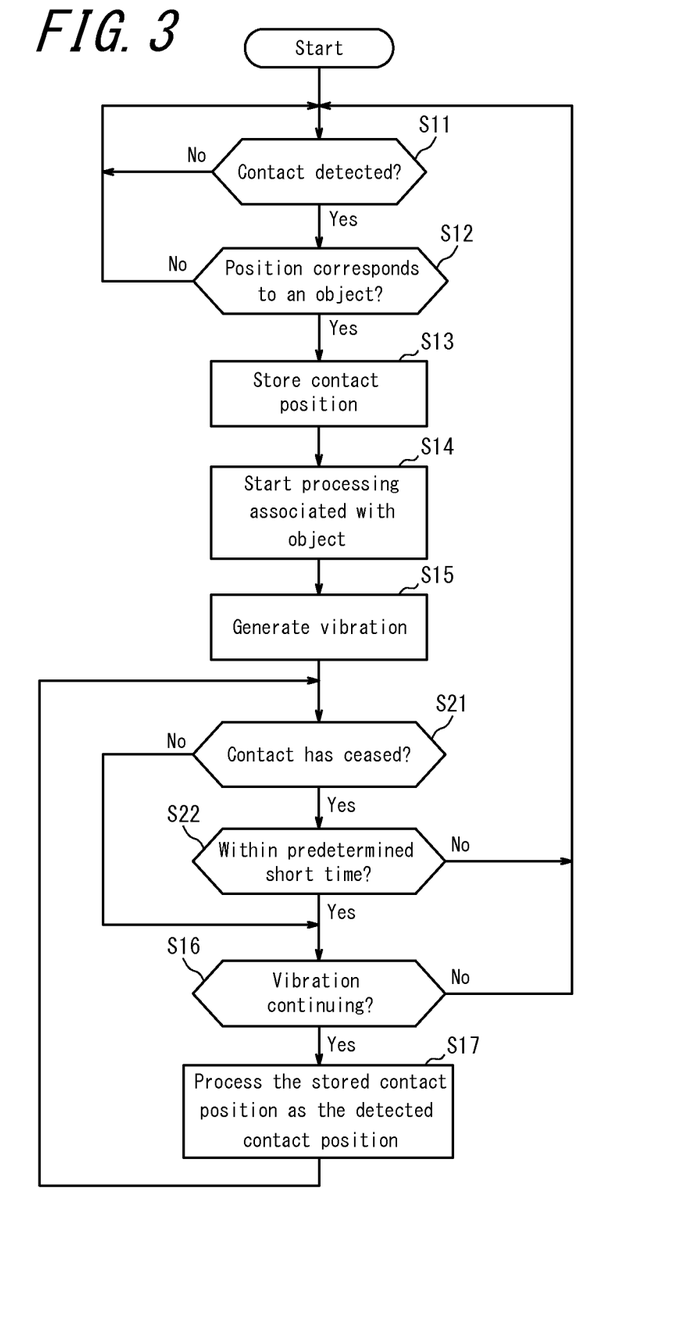
FIG. 3 is a flowchart illustrating processing by the electronic device according to an embodiment of the present invention.

FIG. 3 is a flowchart illustrating processing by the electronic device 2 according to Embodiment 2. In the present embodiment, the electronic device 2 performs the same processing as in Embodiment 1 even when detection by the contact detection unit 40 of the position of contact ceases for a predetermined short time while the vibration unit 50 is vibrating. In other words, in such a case, the electronic device 2 processes a position of contact detected by the contact detection unit 40 before the start of vibration as the position of contact currently being detected by the contact detection unit 40.

As illustrated in FIG. 3, processing from when the contact detection unit 40 detects contact in step S11 until the vibration unit 50 generates vibration in step S15 is the same as in Embodiment 1, and therefore a detailed description is omitted.

Once vibration is generated in step S15, the control unit 10 determines whether detection of contact by the contact detection unit 40 has ceased (step S21). In other words, in step S21, the control unit 10 determines whether the contact detection unit 40 has ceased to detect contact due to a fingertip or the like (contacting object) with which the operator was contacting the contact detection unit 40 becoming separated from the contact detection unit 40. When cessation of contact is not detected in step S21, the control unit 10 proceeds to step S16 and subsequently performs the same processing as in Embodiment 1.

On the other hand, when cessation of contact is detected in step S21, the control unit 10 determines whether a predetermined short time has elapsed since detection of the cessation of contact (step S22). This "predetermined short time" is preferably set not to be too long, for example 0.5 seconds, to allow for differentiation from an operation in which the operator intentionally breaks contact with the contact detection unit 40. When the predetermined short time has elapsed in step S22, the control unit 10 returns to step S11 and continues processing.

On the other hand, as described above, if the contact detection unit 40 detects contact again after ceasing to detect contact momentarily during generation of vibration, it is considered that the operator did not in fact intend to break contact. Therefore, even when cessation of contact is detected in step S21, if the length of cessation is within the predetermined short time (step S22: Yes), the control unit 10 proceeds to step S16 and subsequently performs the same processing as in Embodiment 1.

In other words, even when cessation of contact is detected, the control unit 10 performs the processing in step S17 if the length of cessation is within the predetermined short time and if vibration is still continuing. In step S17, the control unit 10 performs control as in Embodiment 1 to use, as the position of contact detected by the contact detection unit 40, the position of contact stored in step S13.

Accordingly, when detection by the contact detection unit 40 of the contact by the contacting object ceases while the control unit 10 is controlling the vibration unit 50 to vibrate, the control unit 10 performs control to process the position of the contact detected before detection of the contact ceased as the position of the contact being detected by the contact detection unit 40. In other words, in this case, the control unit 10 performs control to treat the position of contact detected before detection of the contact ceased as the position of the contact being detected by the contact detection unit 40.

After step S17, the control unit 10 returns to step S21, and while vibration generated by the vibration unit 50 continues, determines whether cessation of contact is detected, and if so, whether the length of cessation is within the predetermined short time.

By performing this processing, the electronic device 2 of the present embodiment achieves the equivalent effects to the electronic device 1 described in Embodiment 1. Furthermore, the electronic device 2 of the present embodiment uses the position from before generation of vibration even when detection of contact by the contact detection unit 40 momentarily ceases while the vibration unit 50 is generating vibration. Therefore, according to the present embodiment, accuracy of detection of the contact position by the contact detection unit can be increased even when contact by the operator is momentarily broken while vibration is being generated. In other words, according to the present embodiment, even if contact by the operator with the contact detection unit 40 is momentarily broken due to the generated vibration, such a break in contact does not cause the detected position of contact to fluctuate.

Note that the present invention is not limited to the above embodiments, and a variety of modifications and changes are possible. For example, in the above embodiments, an object is displayed on the display unit 30, and the contact detection unit 40 detects contact by the operator. The present invention is not, however, limited to this configuration. For example, a configuration may be envisioned in which instead of providing a display unit 30, objects are printed directly with ink or the like on the touch face of the contact detection unit 40.

In the above embodiments, the memory unit 80 is described as a separate component. An electronic device according to the present invention is not, however, limited to such a configuration, and a variety of configurations may be adopted in accordance with design requirements. For example, a configuration may be adopted wherein the control unit 10 includes the functions of the memory unit 80 in its own cache memory.

Furthermore, in the above embodiments, the contact position is stored in the memory unit 80 in step S13, and the contact position stored in the memory unit 80 is read and used in step S17. The time at which the contact position is stored in the memory unit 80 is not, however, limited to step S13, and a variety of configurations may be adopted in accordance with design requirements and the like. For example, in Embodiment 1, the position of contact may be stored at any time before generation of vibration in step S15. Furthermore, in Embodiment 2, the position of contact may for example be stored at any time before cessation of contact for a short period of time is detected in step S21.

For example, while the vibration unit 50 is generating vibration, the control unit 10 may store the position of contact in the memory unit 80 at predetermined intervals. In this case, if the contact detection unit 40 ceases to detect contact by the contacting object, the control unit 10 preferably performs control to process, among the positions of contact stored in the memory unit 80, the position of contact that was stored in the memory unit 80 immediately before the contact detection unit 40 ceased to detect contact by the contacting object as the position of the contact being detected by the contact detection unit 40.

In the above embodiments, the contact detection unit 40 is used to detect contact on the touch face of the contact detection unit, but alternatively a pressure detection unit may be used to determine that contact has been made when a predetermined standard is satisfied. Such a pressure detection unit can be configured by providing the contact detection unit 40 with any number of strain gauge sensors or the like. The pressure detection unit detects pressure on the touch face of the contact detection unit 40 and is, for example, configured using a strain gauge sensor, a piezoelectric element, or the like that experiences a change in physical or electrical characteristics (strain, resistance, voltage, or the like) in response to pressure. When the pressure detection unit is configured using a piezoelectric element, for example, the magnitude of the voltage (voltage value), which is an electrical characteristic, of the piezoelectric element changes in accordance with the magnitude of the load (force) of the pressure on the touch face of the contact detection unit 40 (or the speed at which the magnitude of the load (force) changes (acceleration)). The pressure detection unit notifies the control unit 10 of the magnitude of the voltage (voltage value, hereinafter referred to simply as data), and the control unit 10 can determine that contact has been made when the voltage value (data) satisfies a predetermined standard.

Furthermore, such a pressure detection unit can be configured in accordance with the contact detection type of the contact detection unit 40. For example, in the case of a resistive film type, a configuration without a strain gauge sensor may be adopted by associating the magnitude of the resistance that corresponds to the size of the contact area with the load (force) of the pressure on the touch face of the contact detection unit 40. Alternatively, in the case of a capacitive type, a configuration without a strain gauge sensor may be adopted by associating the magnitude of the capacitance with the load (force) of the pressure on the touch face of the contact detection unit 40.

The vibration unit 50 may also be configured using any number of piezoelectric elements, by providing a transparent piezoelectric element along the entire surface of the contact detection unit 40, or by rotating an eccentric motor once per period of a drive signal. Furthermore, when the pressure detection unit and the vibration unit 50 are both configured using a piezoelectric element, these units may be combined into a pressure detection and vibration unit that share a common piezoelectric element. The reason is that a piezoelectric element generates an electric charge when pressure is applied and deforms upon application of an electric charge.

Furthermore, as described above, when the magnitude of voltage (voltage value (data)) of a piezoelectric element also functioning as the pressure detection unit satisfies a predetermined standard, the vibration unit 50 can generate vibration by driving the piezoelectric element. Here, the magnitude of voltage (voltage value (data)) of the piezoelectric element satisfying a predetermined standard may refer to the voltage value (data) reaching a predetermined standard value, to the voltage value (data) exceeding a predetermined standard value, or to detection of a voltage value (data) equivalent to a predetermined standard value.

In the above embodiments, a configuration is assumed in which the contact detection unit 40 is layered on the upper surface of the display unit 30. This configuration is not essential to an electronic device according to the present invention, however, and a configuration may be adopted in which the contact detection unit 40 and display unit 30 are separated. A configuration in which the contact detection unit 40 is layered on the display unit 30, however, makes it easier for the operator to recognize the relationship between the displayed image and the generated vibration (as well as the predetermined processing that starts).

Furthermore, the display unit 30 and contact detection unit 40 in the above embodiments may be configured as an integrated device, for example by providing a common substrate with the functions of both a display unit and a contact detection unit. An example of such a device integrating the functions of both a display unit and a contact detection unit is a liquid crystal panel having a matrix of pixel electrodes, with a plurality of photoelectric conversion elements, such as photodiodes, regularly mixed therein. Such a device is contacted by a pen for touch input at a desired position on the panel display, and while displaying images with the liquid crystal panel structure, the device can detect the contact position by light from a backlight for liquid crystal display being reflected by the tip of the pen and received by surrounding photoelectric conversion elements.

The vibration unit 50 may be configured to vibrate the contact detection unit 40 indirectly by causing the electronic device 1 to vibrate via a vibration motor (eccentric motor) or the like, or to vibrate the contact detection unit 40 directly by arranging a piezoelectric element or the like on the contact detection unit 40.

In Embodiment 1, the electronic device 1 uses the position from before generation of vibration as the position detected by the contact detection unit 40 while the vibration unit 50 is generating vibration. An electronic device according to the present invention, however, is not limited to using such a position. For example, an electronic device according to the present invention can use the position from before generation of vibration as the position detected by the contact detection unit 40 when the contact detection unit 40 continues to detect contact by a contacting object while the vibration unit 50 is generating vibration. On the other hand, when the contact detection unit 40 ceases to detect contact by the contacting object while the vibration unit 50 is generating vibration, instead of using the position from before generation of vibration as the position detected by the contact detection unit 40, it may then be considered that no position of contact exists due to the contact detection unit 40 ceasing to detect contact by the contacting object, and a variety of processing may be performed.

Furthermore, in Embodiment 2, when detection of the contact by the contact detection unit 40 ceases, the control unit 10 may perform control to treat the position of the contact detected before detection of the contact ceased as the position of the contact being detected by the contact detection unit 40 regardless of the length of cessation of the contact.

Reference Signs List
  1: Electronic device
  10: Control unit
  30: Display unit
  40: Contact detection unit
  50: Vibration unit
  80: Memory unit

The invention claimed is:
1. An electronic device comprising:
  a contact detection unit configured to detect contact by a contacting object;
  a vibration unit configured to vibrate the contact detection unit; and
  a control unit configured to control the vibration unit to vibrate, wherein the control unit treats a position of the contact detected by the contact detection unit before the control unit controls the vibration unit to vibrate as a position of the contact being detected by the contact detection unit while the control unit controls the vibration unit to vibrate, and the control unit further configured to determine whether the vibration of the vibration unit is still continuing; and if the control unit determines that the vibration of the vibration unit is still continuing, treats the position of the contact detected by the contact detection unit before the control unit controls the vibration unit to vibrate as the position of the contact being detected by the contact detection unit while the control unit controls the vibration unit to vibrate.

2. The electronic device according to claim 1, wherein the control unit further executes a process corresponding to the position of the contact being detected by the contact detection unit.

3. An electronic device comprising:
a contact detection unit configured to detect contact by a contacting object;
a vibration unit configured to vibrate the contact detection unit; and
a control unit configured to control the vibration unit to vibrate, wherein
when detection by the contact detection unit of the contact by the contacting object ceases while the control unit is controlling the vibration unit to vibrate, the control unit treats a position of the contact detected before detection of the contact ceases as a position of the contact being detected by the contact detection unit, and
when the detection by the contact detection unit of the contact by the contacting object ceases while the control unit is controlling the vibration unit to vibrate, the control unit treats the position of the contact detected before detection of the contact ceases while the control unit controls the vibration unit to vibrate as the position of the contact being detected by the contact detection unit.

4. The electronic device according to claim 3, wherein the control unit further executes a process corresponding to the position of the contact being detected by the contact detection unit.

5. An electronic device comprising:
a contact detection unit configured to detect contact by a contacting object;
a vibration unit configured to vibrate the contact detection unit; and
a control unit configured to control the vibration unit to vibrate, wherein
when detection by the contact detection unit of the contact by the contacting object ceases while the control unit is controlling the vibration unit to vibrate, the control unit treats a position of the contact detected before detection of the contact ceases as a position of the contact being detected by the contact detection unit, and
the control unit determines whether the vibration of the vibration unit is still continuing and whether the detection by the contact detection unit of the contact by the contacting object ceases; and when the control unit determines that the vibration of the vibration unit is still continuing and that the detection by the contact detection unit of the contact by the contacting object ceases while the control unit is controlling the vibration unit to vibrate, the control unit treats the position of the contact detected before the detection of the contact ceases while the control unit controls the vibration unit to vibrate as the position of the contact being detected by the contact detection unit.

6. The electronic device according to claim 5, wherein the control unit further executes a process corresponding to the position of the contact being detected by the contact detection unit.

* * * * *